(12) United States Patent
Glickman et al.

(10) Patent No.: US 10,449,729 B1
(45) Date of Patent: Oct. 22, 2019

(54) 3D PRINTED FIBER OPTICS

(71) Applicant: Multek Technologies Ltd., San Jose, CA (US)

(72) Inventors: Michael James Glickman, Mountain View, CA (US); Jennet Ellen Johnson, Huntersville, NC (US)

(73) Assignee: Multek Technologies Ltd., San Jose, CA (US)

( * ) Notice: Subject to any disclaimer, the term of this patent is extended or adjusted under 35 U.S.C. 154(b) by 696 days.

(21) Appl. No.: 14/958,603

(22) Filed: Dec. 3, 2015

(51) Int. Cl.
| | |
|---|---|
| *B29C 67/00* | (2017.01) |
| *G02B 6/036* | (2006.01) |
| *B29C 35/08* | (2006.01) |
| *B29L 11/00* | (2006.01) |
| *B33Y 30/00* | (2015.01) |

(52) U.S. Cl.
CPC ...... *B29C 67/0059* (2013.01); *B29C 35/0805* (2013.01); *G02B 6/03638* (2013.01); *B29C 2035/0827* (2013.01); *B29L 2011/0075* (2013.01); *B33Y 30/00* (2014.12)

(58) Field of Classification Search
CPC .. G02B 6/02395; B33Y 30/00; B29C 35/0805
See application file for complete search history.

(56) References Cited

U.S. PATENT DOCUMENTS

| | | | |
|---|---|---|---|
| 5,434,751 A | 7/1995 | Cole, Jr. | |
| 5,865,918 A | 2/1999 | Franklin | |
| 6,442,323 B1 * | 8/2002 | Sorosiak | G02B 6/3608 385/137 |
| 6,697,694 B2 | 2/2004 | Mogensen | |
| 6,778,754 B1 * | 8/2004 | Hirayama | G02B 6/25 156/158 |
| 6,905,569 B2 * | 6/2005 | Kim | G02B 6/3608 156/153 |
| 6,997,698 B2 | 2/2006 | Silverbrook | |
| 7,405,134 B2 | 7/2008 | Yudaska | |
| 7,409,977 B2 | 8/2008 | Rice | |
| 7,633,765 B1 | 12/2009 | Scanlan | |

(Continued)

FOREIGN PATENT DOCUMENTS

| | | | | |
|---|---|---|---|---|
| JP | 60026308 A | * | 2/1985 | ........... G02B 6/4432 |

OTHER PUBLICATIONS

Office action dated Jun. 28, 2018, U.S. Appl. No. 14/468,268, filed Aug. 25, 2014, applicant: Weifeng Liu, 7 pages.

*Primary Examiner* — Daniel Petkovsek
(74) *Attorney, Agent, or Firm* — Haverstock & Owens LLP

(57) ABSTRACT

A 3D printing system includes a 3D printer configured to receive as input a coated or un-coated optical fiber, to coat the optical fiber in the case of an input un-coated optical fiber, to treat an outer coating of the coated optical fiber, and to precisely output the coated optical fiber onto a specific location on a substrate such that the coated optical fiber is securely attached to the substrate via the treated outer coating. The 3D printer has a nozzle head that includes treating element for treating, such as heating or curing, the outer coating of the coated optical fiber. The 3D printer also includes a movement mechanism, such as an XYZ gantry, coupled to the nozzle head such that the nozzle head can be precisely moved relative to the substrate for well controlled placement of the treated coated optical fiber on the substrate.

21 Claims, 3 Drawing Sheets

(56) References Cited

U.S. PATENT DOCUMENTS

| | | |
|---|---|---|
| 7,793,411 B2 | 9/2010 | Shintate |
| 8,033,312 B2 | 10/2011 | Fries |
| 8,098,408 B2 | 1/2012 | Sawada |
| 8,110,057 B2 | 2/2012 | Rice |
| 8,882,955 B2 | 11/2014 | Brandon |
| 9,017,509 B2 * | 4/2015 | Sidhu .................. G02B 6/3612 156/280 |
| 9,579,829 B2 * | 2/2017 | Williams ............. B29C 39/026 |
| 9,599,774 B2 * | 3/2017 | Kubo .................. G02B 6/3612 |
| 10,016,942 B2 * | 7/2018 | Mark ..................... B29C 70/20 |
| 2004/0265593 A1 | 12/2004 | Kamijo |
| 2005/0117859 A1 * | 6/2005 | Suzuki ................... G02B 6/448 385/114 |
| 2008/0074697 A1 | 3/2008 | Sawada |
| 2012/0305638 A1 | 12/2012 | Szesko |
| 2013/0011629 A1 | 1/2013 | Brandon |
| 2016/0136885 A1 * | 5/2016 | Nielsen-Cole ......... B33Y 30/00 425/462 |
| 2016/0136887 A1 * | 5/2016 | Guillemette .......... B29C 69/001 428/375 |
| 2017/0015061 A1 * | 1/2017 | Lewicki ................ B33Y 10/00 |

* cited by examiner

3D PRINTED FIBER OPTICS

FIELD OF THE INVENTION

The present invention is generally directed to 3D printing systems and optical fibers. More specifically, the present invention is directed to a system for precisely positioning and securing an optical fiber onto a substrate using a 3D printer.

BACKGROUND OF THE INVENTION 3D printing is any of various processes used to make a three-dimensional object. Additive processes are used in which successive layers of material are laid down under computer control. These objects can be of almost any shape or geometry, and are produced from a 3D model or other electronic data source.

A large number of additive processes are now available. One type of process is an extrusion process that produces an object by extruding small beads of material which harden immediately to form layers. Various polymers can be used as the building material, including acrylonitrile butadiene styrene (ABS), polycarbonate (PC), polylactic acid (PLA), high density polyethylene (HDPE), PC/ABS, polyphenylsulfone (PPSU) and high impact polystyrene (HIPS). In general, the polymer is in the form of a filament that can be fed to an extrusion nozzle head. Metal can also be used, where metal wire is fed to the extrusion nozzle head. The extrusion nozzle head is heated to melt the material, which is then deposited out the extrusion nozzle head. The extrusion nozzle head can be moved in both horizontal and vertical directions by a controlled movement mechanism, such as an XYZ gantry. The movement mechanism moves the extrusion nozzle head according to a computer program, such as a computer-aided manufacturing (CAM) software package running on a microcontroller, and the object is built from the bottom up, one layer at a time.

SUMMARY OF THE INVENTION

A 3D printing system includes a 3D printer configured to receive as input a coated or un-coated optical fiber, to coat the optical fiber in the case of an input un-coated optical fiber, to treat an outer coating of the coated optical fiber, and to precisely output the coated optical fiber onto a specific location on a substrate such that the coated optical fiber is securely attached to the substrate via the treated outer coating. The 3D printer has a nozzle head that includes treating element for treating, such as heating or curing, the outer coating of the coated optical fiber. The 3D printer can include a coating mechanism for applying an outer coating to an un-coated optical fiber. The coating mechanism can also be configured to apply a separate adhesive to the outer coating. The 3D printer can also include a movement mechanism, such as an XYZ gantry, coupled to the nozzle head such that the nozzle head can be precisely moved relative to the substrate for well controlled placement of the treated coated optical fiber on the substrate. Alternatively, the nozzle head remains stationary and the movement mechanism is coupled to a substrate mount so as to move the substrate relative to the stationary nozzle head.

In an aspect, a system for assembling a fiber optic assembly is disclosed. The system includes a substrate, a coated optical fiber, a nozzle head and a movement mechanism. The coated optical fiber comprises an optical fiber and an outer coating coupled to the optical fiber, wherein the outer coating is configured to attach to the substrate when treated. The nozzle head is configured to receive the coated optical fiber as input, to treat the outer coating for attachment to the substrate and to output the coated optical fiber. The movement mechanism is coupled to the nozzle head. The movement mechanism is configured to place the coated optical fiber output from the nozzle head onto a specific location on the substrate. The coated optical fiber output from the nozzle head is treated by the nozzle head such that placing the coated optical fiber on the substrate securely attaches the coated optical fiber to the substrate via the outer coating. In some embodiments, the optical fiber comprises a transparent core having a first index of refraction, a transparent cladding material surrounding the transparent core having a second index of refraction that is lower than the first index of refraction, and one or more buffer layers surrounding the transparent cladding. In some embodiments, the outer coating comprises one of a polymer material, a thermoplastic material or a thermosetting material. In some embodiments, the nozzle head comprises an extrusion nozzle head. In some embodiments, the movement mechanism comprises an XYZ gantry. In some embodiments, the nozzle head comprises a heating element, wherein treating the outer coating comprises heating the outer coating. In some embodiments, the nozzle head comprises a curing element, wherein treating the outer coating comprises curing the outer coating. In some embodiments, the curing element comprises an ultraviolet light source. In some embodiments, system further comprises a pressing element configured to press the coated optical fiber onto the substrate.

In another aspect, a three-dimensional printer is disclosed. The three-dimensional printer includes a nozzle head and a movement mechanism. The nozzle head is configured to receive as input a coated optical fiber comprising an optical fiber and an outer coating coupled to the optical fiber. The nozzle head is further configured to output the coated optical fiber. The nozzle head comprises a treating element configured to treat the outer coating of the output coated optical fiber. The movement mechanism is coupled to the nozzle head. The movement mechanism is configured to place the coated optical fiber output from the nozzle head onto a specific location on a substrate. The coated optical fiber output from the nozzle head is treated such that placing the coated optical fiber on the substrate securely attaches the coated optical fiber to the substrate via the outer coating.

In yet another aspect, another system for assembling a fiber optic assembly is disclosed. The system includes a substrate, an optical fiber, a nozzle head and a movement mechanism. The nozzle head is configured to receive the optical fiber as input, to apply an outer coating to the optical fiber, to treat the outer coating for attachment to the substrate and to output the coated optical fiber. The movement mechanism is coupled to the nozzle head. The movement mechanism is configured to place the coated optical fiber output from the nozzle head onto a specific location on the substrate. The coated optical fiber output from the nozzle head is treated by the nozzle head such that placing the coated optical fiber on the substrate securely attaches the coated optical fiber to the substrate via the outer coating. In some embodiments, the nozzle head comprises a coating mechanism configured to apply the outer coating to the optical fiber.

In still yet another embodiment, another three-dimensional printer is disclosed. The three-dimensional printer includes a nozzle head and a movement mechanism. The nozzle head is configured to receive as input an optical fiber, to apply an outer coating to the optical fiber, and to output the coated optical fiber. The nozzle head comprises a coating mechanism configured to apply the outer coating to the optical fiber. The nozzle head further comprises a treating element configured to treat the outer coating of the output coated optical fiber. The movement mechanism is coupled to the nozzle head. The movement mechanism is configured to place the coated optical fiber output from the nozzle head onto a specific location on a substrate. The coated optical fiber output from the nozzle head is treated such that placing the coated optical fiber on the substrate securely attaches the coated optical fiber to the substrate via the outer coating.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Figure 1:
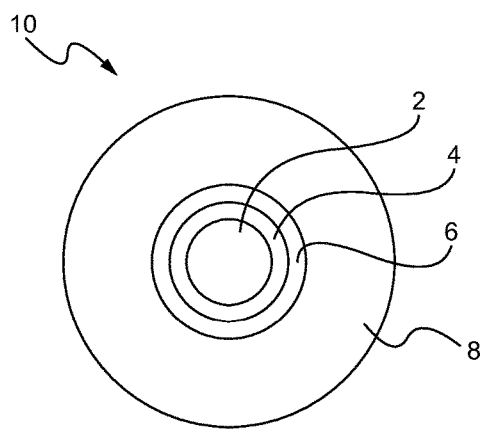
FIG. 1 illustrates a cross-section of a coated optical fiber according to an embodiment.

Embodiments of the present application are directed to a 3D printing system. Those of ordinary skill in the art will realize that the following detailed description of the 3D printing system is illustrative only and is not intended to be in any way limiting. Other embodiments of the 3D printing system will readily suggest themselves to such skilled persons having the benefit of this disclosure.

Reference will now be made in detail to implementations of the 3D printing system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments are directed to a 3D printing system that includes a 3D printer configured to receive as input a coated or un-coated optical fiber, to coat the optical fiber in the case of an input un-coated optical fiber, to treat an outer coating of the coated optical fiber, and to precisely output the coated optical fiber onto a specific location on a substrate such that the coated optical fiber is securely attached to the substrate via the treated outer coating. In some embodiments, the outer coating is a thermoplastic material. In other embodiments, the outer coating is a thermosetting material. Treating the outer coating is performed by heating or curing. The 3D printer includes a nozzle head that has an input for receiving the coated optical fiber and an output for outputting the coated optical fiber. The nozzle head also includes a heating element and/or a curing element for heating or curing the outer coating of the coated optical fiber. The 3D printer can include a coating mechanism for applying an outer coating to an un-coated optical fiber. The coating mechanism can also be configured to apply a separate adhesive to the outer coating. The 3D printer can also include a movement mechanism, such as an XYZ gantry, coupled to the nozzle head such that the nozzle head can be precisely moved relative to the substrate. In some embodiments, the nozzle head is configured to heat or cure the outer coating as the coated optical fiber is being output from the nozzle head onto the substrate. The outer coating is in a transition phase when contacted to the substrate and completely cools or cures after being placed on the substrate. In other embodiments, the heating element and/or curing element may be aligned to heat or cure the coated optical fiber as it is being output from the nozzle head and after it is placed onto the substrate. In either case, the outer coating completes cooling or curing while contacted with the substrate such that once the outer coating is completely cooled or cured the coated optical fiber is securely attached to the substrate.

An optical fiber is a flexible, transparent fiber made by drawing dielectric material, such as glass (silica) or plastic, to a very small diameter, such as less than 200 micrometers. Optical fibers are used most often as a means to transmit light between the two ends of the fiber and find wide usage, such as in fiber-optic communications, illumination, sensors and lasers. An optical fiber is a cylindrical dielectric waveguide (nonconducting waveguide) that transmits light by a process of total internal reflection. FIG. 1 illustrates a cross-section of a coated optical fiber according to an embodiment. The coated optical fiber 10 includes an optical fiber surrounded by an outer coating. The optical fiber includes an inner core 2, a cladding layer 4 and a buffer coating 6. The inner core 2 is surrounded by the cladding layer 4. The buffer coating 6 surrounds the cladding layer 4. An outer coating 8 surrounds the buffer coating 6. The exemplary configuration shown in FIG. 1 shows the inner core 2, the cladding layer 4 and the outer coating 8 as a series of concentric layers. Although the buffer coating 6 is shown as a single layer, the buffer coating 6 is representative of one or more buffer coatings, each buffer coating forming a separate layer. In some embodiments, the inner core 2 and the cladding layer 4 are both made of dielectric materials. To confine the optical signal in the inner core 2, the refractive index of the inner core material is greater than that of the cladding layer material. The buffer coating 6 protects the cladding layer 4 from moisture and physical damage. In some embodiments, the buffer coating is a UV-cured urethane acrylate composite material applied to the outside of the cladding during the drawing process. In some embodiments, a dual-layer buffer coating approach is employed. An inner primary buffer coating functions as a shock absorber to minimize attenuation caused by microbending. An outer secondary buffer coating protects the primary buffer coating against mechanical damage and acts as a barrier to lateral forces.

The relative thicknesses of the inner core 2, the cladding layer 4, the buffer coating 6 and the outer coating 8 shown in FIG. 1 are for illustrative purposes only. It is understood that the relative thicknesses of each can be different than that shown in FIG. 1.

The material of the outer coating 8 is selected such that once treated, the coated optical fiber 10 can be attached to a substrate via the outer coating 8. In other words, the treated outer coating 8 functions as an adhesive, a bonding agent or the like between the optical fiber and the substrate. In some embodiments, the outer coating 8 is a thermoplastic material. Thermoplastic material is capable of softening or fusing when heated and of hardening again when cooled. In other embodiments, the outer coating 8 is a thermosetting material. Thermosetting material is capable of becoming permanently rigid when heated or cured. The outer coating 8 is treated by heating or curing. In some embodiments, high powered UV curing is performed. Materials used as the outer coating 8 include, but are not limited to, epoxy, acrylate, polyimide, silicone, polyethylene, polypropylene, PVC (polyvinyl chloride), PVDF (polyvinylidene fluoride), PEEK (polyether ether ketone), PBT (polybutylene terephthalate) or fluoracrylate.

Figure 2:
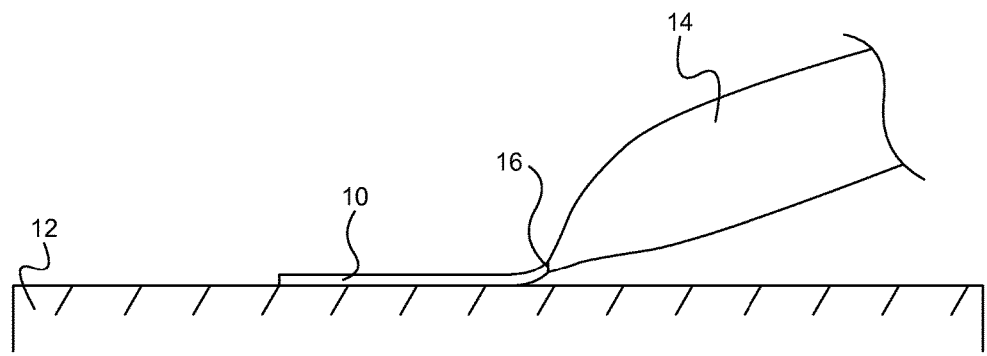
FIG. 2 illustrates a schematic side view of a nozzle head applying a coated optical fiber to a substrate according to an embodiment.
Figure 4:
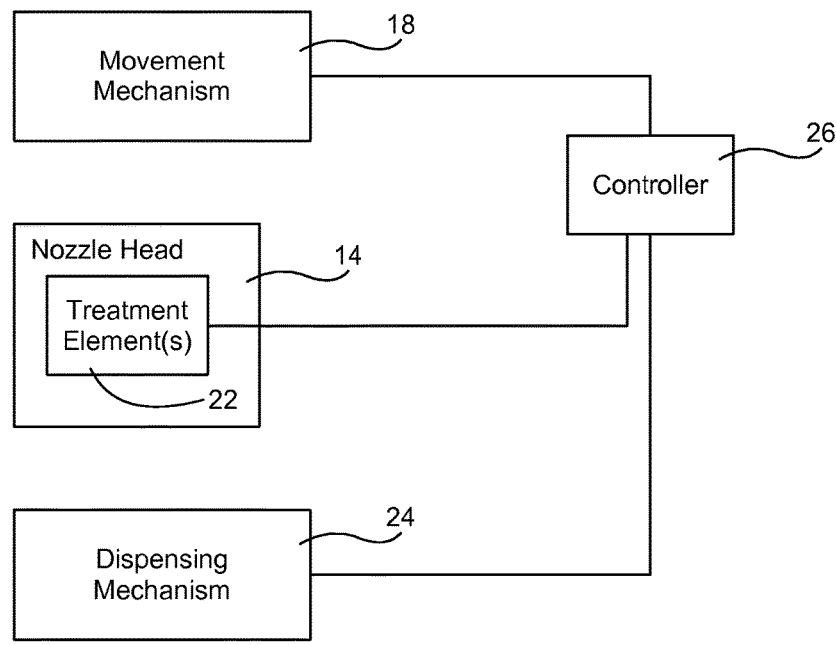
FIG. 4 illustrates a block diagram of a 3D printing control structure according to an embodiment.

A 3D printer is configured to treat an outer coating of an optical fiber. In some embodiments, the 3D printer is configured to receive an optical fiber that is pre-coated with an outer coating, such as the coated optical fiber 10 in FIG. 1. The 3D printer includes a nozzle head that has an input for receiving the coated optical fiber and an output for outputting the coated optical fiber. The nozzle head also includes one or more heating elements and/or a curing elements for heating or curing the outer coating of the coated optical fiber. FIG. 2 illustrates a schematic side view of a nozzle head applying a coated optical fiber to a substrate according to an embodiment. The nozzle head 14 is configured to output the coated optical fiber 10 via a nozzle head output 16 where the treated coated optical fiber is applied to a select position on the substrate 12. In some embodiments, a pressing element (not shown) is used to press the applied coated optical fiber 10 to the substrate 12. For example, the pressing element can be a wheel configured to trail behind the nozzle head 14. The pressing element can be coupled to the nozzle head so that the two move in unison or the pressing element can be detached from the nozzle head and be configured to move independently. In some embodiments, the nozzle head itself can be configured to press the optical fiber onto the substrate as the optical fiber is being output from the nozzle head. The coated optical fiber 10 is treated by a treating element 22 (FIG. 4). The treating element 22 is configured to treat the outer coating 8, but leave the optical fiber including the inner core 4, the cladding layer 6 and the buffer coating 6 unaffected. The treating element 22 is part of the nozzle head 14. The treating element 22 is representative of one or more treating elements, for example a heating element, a curing element or both a heating element and a curing element. An example of a curing element is an ultraviolet light source. In some embodiments, the treating element is interiorly positioned within the nozzle head 14 so as to heat or cure the outer coating 8 prior to outputting the coated optical fiber 10 from the nozzle head 14. The outer coating 8 is in a transition phase when contacted to the substrate 12 and completely cools or cures after being placed on the substrate 12. In other embodiments, the treating element may be exteriorly positioned on the nozzle head 14 so as to heat or cure the outer coating 8 as it is output from the nozzle head 14. The exteriorly positioned treating elements may also be configured so as to also or alternatively heat or cure the outer coating 8 after it is placed onto the substrate 12. In other embodiments, treating elements are both interiorly positioned within and exteriorly positioned on the nozzle head 14. In either case, the outer coating 8 is in a transitional phase when contacted to the substrate 12 such that the coated optical fiber 10 adheres in place, thereby maintaining it's desired position on the substrate 12. The outer coating 8 completes cooling or curing while contacted with the substrate 12 such that once the outer coating 8 is completely cooled or cured the coated optical fiber 10 is securely attached to the substrate 12. In still other embodiments, the coated optical fiber 10 is only treated after being positioned on the substrate 12.

Figure 3:
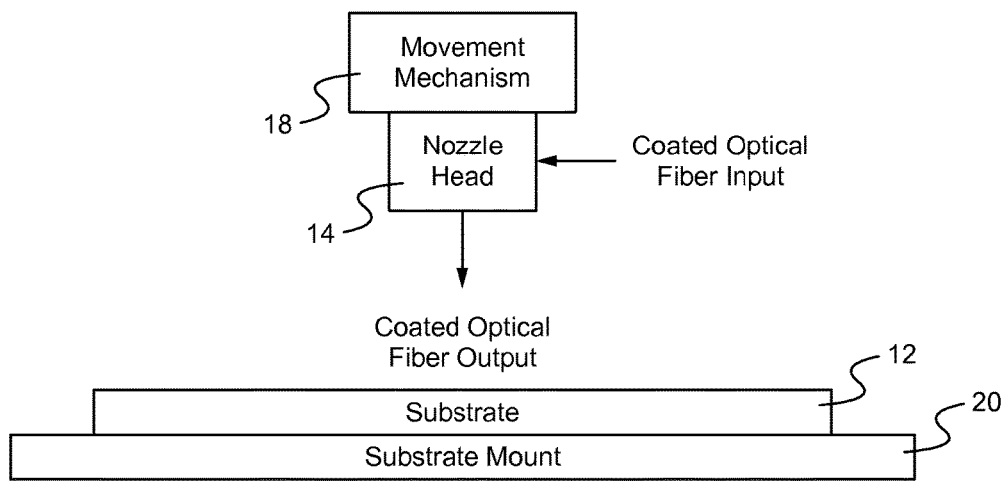
FIG. 3 illustrates a conceptual block diagram of a 3D printer according to an embodiment.

The 3D printer is also configured to precisely place the coated optical fiber 10 onto a specific location(s) on the substrate 12. FIG. 3 illustrates a conceptual block diagram of a 3D printer according to an embodiment. The 3D printer includes the nozzle head 14, a movement mechanism 18 and a substrate mount 20. The substrate mount 20 is configured to mount the substrate 12. The substrate mount 20 is coupled to the movement mechanism 18. In some embodiments, the movement mechanism 18 is coupled to the nozzle head 14 such that the nozzle head 14 can be precisely moved relative to the substrate mount 20 and therefore the substrate 12. In other embodiments, the movement mechanism 18 is coupled to the substrate mount 20 such that the substrate mount 20 can be precisely moved relative to the nozzle head 14, which remains stationary. In some embodiments, the movement mechanism 18 is an XYZ gantry. In other embodiments, the movement mechanism 18 is a 6-axis movement mechanism. It is understood that the movement mechanism 18 can be any conventional movement mechanism capable of precisely moving the nozzle head 14 relative to the substrate 12.

The movement mechanism 18 is enabled to align the nozzle head output 16 for proper placement of the coated optical fiber 10 on the substrate 12. Such placement is a delicate and precise process which is accomplished using well controlled advancement of the movement mechanism 18. Fine-tuned advancement is controlled by a programmed controller. FIG. 4 illustrates a block diagram of a 3D printing control structure according to an embodiment. The 3D printing control structure includes a controller 26 electronically coupled to the movement mechanism 18, the treatment element(s) 22 and a dispensing mechanism 24. The controller 26 provides control signaling to the movement mechanism 18, the treatment element 22 and the dispensing mechanism 24. The dispensing mechanism 24 is coupled to the nozzle head 14 and is configured to physically supply the input material(s), such as the coated optical fiber, to the nozzle head 14. The dispensing mechanism 24 can also be configured to store the input material(s) for subsequent distribution to the nozzle head 14. The dispensing mechanism 24 can be part of the 3D printer, such as the 3D printer of FIG. 3, or can be an external component coupled to the 3D printer. In some embodiments, the coated optical fiber 10 is dispensed from the nozzle head 14 by the adhesion force of the portion of the coated optical fiber 10 already applied to the substrate 12, essentially pulling the coated optical fiber 10 out of the nozzle head 14 as the nozzle head 10 moves relative to the substrate 12. In other embodiments, the dispensing mechanism 24 includes rollers for "pushing" the coated optical fiber 10 out of the nozzle head. In still other embodiments, a combination of both the "pulling" force due to adhesion and the "pushing" force of the rollers is used to dispense the coated optical fiber 10 from the nozzle head 14.

Figure 5:
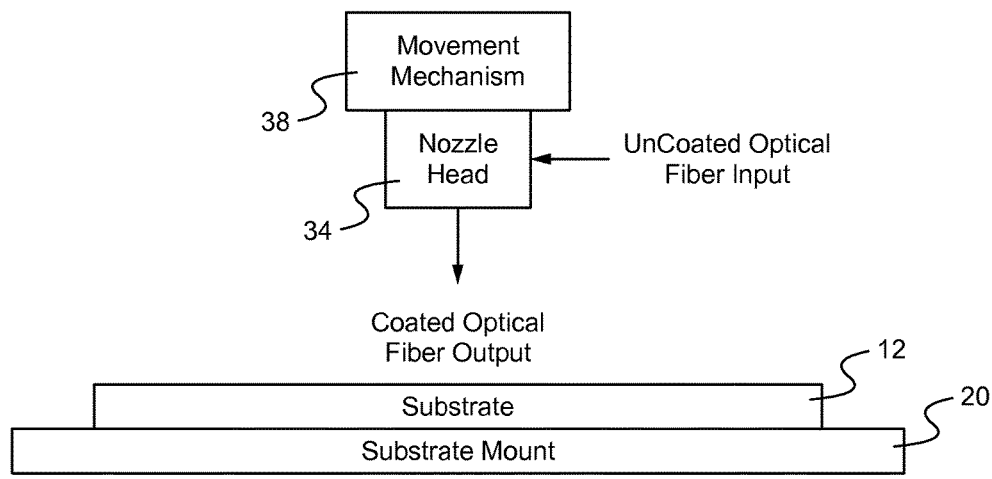
FIG. 5 illustrates a schematic side view of a nozzle head receiving as input an un-coated optical fiber and applying a coated optical fiber to the substrate according to an embodiment.
Figure 6:
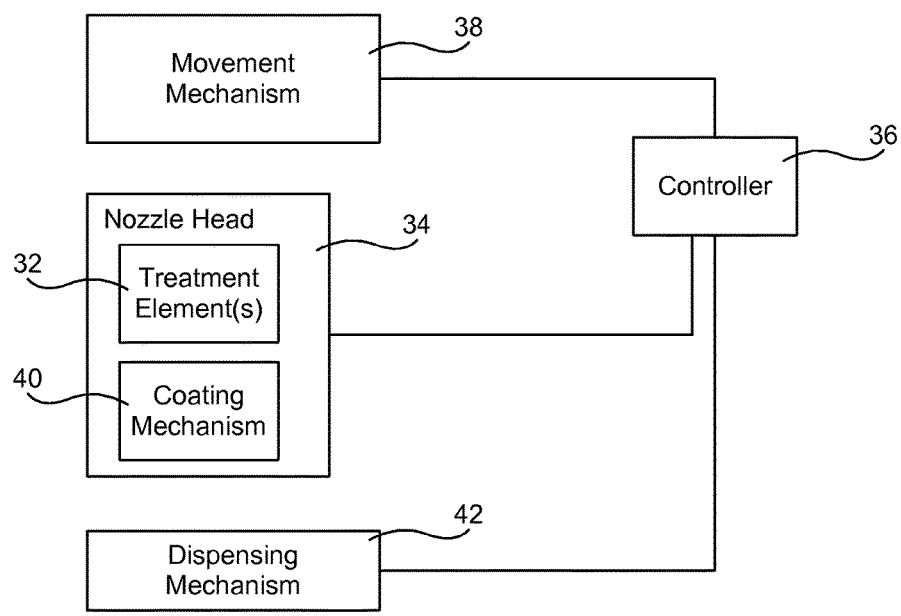
FIG. 6 illustrates a block diagram of a 3D printing control structure according to another embodiment.

In some embodiments, the 3D printer is configured to receive an optical fiber that is not pre-coated with an outer coating. FIG. 5 illustrates a schematic side view of a nozzle head 34 receiving as input an un-coated optical fiber and applying a coated optical fiber to the substrate 12 according to an embodiment. FIG. 6 illustrates a block diagram of a 3D printing control structure according to an embodiment. The 3D printing control structure includes a controller 36 electronically coupled to a movement mechanism 38, treatment element(s) 32, a coating mechanism 40 and a dispensing mechanism 42. The system and constituent components of FIGS. 5 and 6 function similarly to the system and complimentary components of FIGS. 3 and 4 except that the system of FIGS. 5 and 6 is configured to receive and process an un-coated optical fiber instead of a coated optical fiber. In the embodiment shown in FIG. 5, the optical fiber input to the 3D printer may be configured similarly as the coated optical fiber 10 in FIG. 1 but without the outer coating 8. The coating mechanism 40 receives the un-coated optical fiber and applies an outer coating. The applied outer coating can be similar to the outer coating 8 in FIG. 1. The coated optical fiber is output from the coating mechanism 40 and directed to the treatment elements 32. In some embodiments, the coating mechanism 40 is included as part of the nozzle head 34. In other embodiments, the coating mechanism is separate from the nozzle head.

The 3D printing control structure of FIG. 6 functions similarly as the 3D printing control structure of FIG. 4 with the additional control and functionality of the coating mechanism 40. In some embodiments, the coating mechanism 40 is further configured to apply an additional adhesive to some or all of the circumference of the outer coating 8. The additional adhesive can be used to secure the optical fiber as it is placed on the substrate, especially in those embodiments where the outing coating is not treated until after it is placed on the substrate.

In some embodiments, the 3D printer is configured as a modified 3D extrusion printer where the input material is the coated optical fiber and the "extruded" output is the treated coated optical fiber. Alternatively, the input materials can be an optical fiber and separate outer coating material. In this case, the outer coating material is processed and applied as an outer coating to the optical fiber, thereby resulting in the treated coated optical fiber, which is "extruded" from the nozzle head. Processing of the outer coating material can include treating the outer coating material such as by heating and/or curing.

The present application has been described in terms of specific embodiments incorporating details to facilitate the understanding of the principles of construction and operation of the 3D printing system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A system for assembling a fiber optic assembly, the system comprising:
    a. a substrate;
    b. a coated optical fiber comprising an optical fiber and an outer coating coupled to the optical fiber, wherein the outer coating is configured to attach to the substrate when treated;
    c. a nozzle head configured to receive the coated optical fiber as input, to treat the outer coating to a transition phase for attachment to the substrate and to output the coated optical fiber; and
    d. a movement mechanism coupled to the nozzle head, wherein the movement mechanism is configured to place the coated optical fiber output from the nozzle head onto a specific location on the substrate, further wherein the coated optical fiber output from the nozzle head is treated by the nozzle head such that placing the coated optical fiber on the substrate securely attaches the coated optical fiber to the substrate via the outer coating.

2. The system of claim 1 wherein the optical fiber comprises a transparent core having a first index of refraction, a transparent cladding material surrounding the transparent core having a second index of refraction that is lower than the first index of refraction, and one or more buffer layers surrounding the transparent cladding.

3. The system of claim 1 wherein the outer coating comprises one of a polymer material, a thermoplastic material or a thermosetting material.

4. The system of claim 1 wherein the nozzle head comprises an extrusion nozzle head.

5. The system of claim 1 wherein the movement mechanism comprises an XYZ gantry.

6. The system of claim 1 wherein the nozzle head comprises a heating element, wherein treating the outer coating comprises heating the outer coating.

7. The system of claim 1 wherein the nozzle head comprises a curing element, wherein treating the outer coating comprises curing the outer coating.

8. The system of claim 7 wherein the curing element comprises an ultraviolet light source.

9. The system of claim 1 further comprising a pressing element configured to press the coated optical fiber onto the substrate.

10. The system of claim 1 wherein the nozzle head is configured to treat the outer coating prior to application of the coated optical fiber onto the substrate.

11. A system for assembling a fiber optic assembly, the system comprising:
    a. a substrate;
    b. an optical fiber;
    c. a nozzle head configured to receive the optical fiber as input, wherein the nozzle head comprises a coating mechanism configured to apply an outer coating to the optical fiber to form a coated optical fiber and the nozzle head further comprises a treating element separate from the coating mechanism and configured; to treat the outer coating on the coated optical fiber to a transition phase for attachment to the substrate, wherein the nozzle head is further configured to output the coated optical fiber; and
    d. a movement mechanism coupled to the nozzle head, wherein the movement mechanism is configured to place the coated optical fiber output from the nozzle head onto a specific location on the substrate, further wherein the coated optical fiber output from the nozzle head is treated by the nozzle head such that placing the coated optical fiber on the substrate securely attaches the coated optical fiber to the substrate via the outer coating.

12. The system of claim 11 wherein the optical fiber comprises a transparent core having a first index of refraction, a transparent cladding material surrounding the transparent core having a second index of refraction that is lower than the first index of refraction, and one or more buffer layers surrounding the transparent cladding.

13. The system of claim 11 wherein the outer coating comprises one of a polymer material, a thermoplastic material or a thermosetting material.

14. The system of claim 11 wherein the nozzle head comprises an extrusion nozzle head.

15. The system of claim 11 wherein the movement mechanism comprises an XYZ gantry.

16. The system of claim 11 wherein the nozzle head comprises a heating element, wherein treating the outer coating comprises heating the outer coating.

17. The system of claim 11 wherein the nozzle head comprises a curing element, wherein treating the outer coating comprises curing the outer coating.

18. The system of claim 17 wherein the curing element comprises an ultraviolet light source.

19. The system of claim 11 wherein the nozzle head comprises a coating mechanism configured to apply the outer coating to the optical fiber.

20. The system of claim 11 further comprising a pressing element configured to press the coated optical fiber onto the substrate.

21. The system of claim 11 wherein the nozzle head is configured to treat the outer coating prior to application of the coated optical fiber onto the substrate.

* * * * *